United States Patent [19]
Zalewski et al.

[11] Patent Number: 5,245,820
[45] Date of Patent: Sep. 21, 1993

[54] AIR TURBINE STARTER WITH PASSIVE HYDRAULIC CAPACITOR

[75] Inventors: Edwin S. Zalewski, Beverly, Mass.; Jon P. Rominek, Tempe; Phillip L. Grieme, Cave Creek, both of Ariz.

[73] Assignee: AlliedSignal Inc., Morris Township, Morris County, N.Y.

[21] Appl. No.: 450,640

[22] Filed: Dec. 13, 1989

[51] Int. Cl.$^5$ ............................................. F02C 7/268
[52] U.S. Cl. .................................. 60/39.08; 60/39.142
[58] Field of Search ........................ 60/39.08, 39.142; 184/6.11; 415/175

[56] References Cited

U.S. PATENT DOCUMENTS

| | | | |
|---|---|---|---|
| 4,153,141 | 5/1979 | Methlie | 60/39.08 |
| 4,564,084 | 1/1986 | Heckel | 60/39.08 |
| 4,717,000 | 1/1988 | Weddington et al. | 60/39.08 |
| 4,779,413 | 10/1988 | Mouton | 60/39.08 |

Primary Examiner—Louis J. Casaregola
Attorney, Agent, or Firm—Joseph R. Black; James W. McFarland; Robert A. Walsh

[57] ABSTRACT

An air turbine starter containing a liquid lubricant is provided with a passive hydraulic capacitor which is charged by operation of the starter. Charging the capacitor partially drains the lubricant reservoir contained in the starter. This partial drainage decreases drag on internal, rotating components of the starter, thereby decreasing parasitic loss in output torque. The capacitor discharges the lubricant back into the starter when the latter discontinues running, thereby satisfying lubrication requirements of an internal overrunning clutch.

7 Claims, 2 Drawing Sheets

AIR TURBINE STARTER WITH PASSIVE HYDRAULIC CAPACITOR

TECHNICAL FIELD

The present invention relates generally to air turbine starter motors and more particularly to the combination of such a motor with a hydraulic capacitor. The capacitor is employed to partially deplete a lubricant reservoir in the motor during operation of the latter and to replenish the reservoir when operation of the motor is discontinued.

BACKGROUND OF THE INVENTION

FIGS. 1 through 3 of the accompanying drawings will be used in describing problems addressed by the invention. Referring to FIG. 1, a gas turbine engine 10 is typically started by first starting an auxiliary power unit (APU) 12. In the illustrated scheme the APU 12, acting through a gearbox 14, drives an air compressor 16 that supplies pressurized air along a conduit 18 leading to an air turbine starter 20. Upon receiving a command signal to initiate startup of the engine 10, an electronic control unit 22 energizes a coil (not shown) which actuates open a valve 24, thus permitting pressurized air to be delivered to the inlet of the starter 20. The output shaft 26 of the starter 20 is drivingly engaged with the engine 10 through the gearbox 14. The starter 20 by itself provides starting torque for the engine 10 until the latter reaches its light-off speed, after which both the starter and the engine provide acceleration torque until the engine reaches some percentage of its design speed. At that point, the starter 20 should have reached its cutout speed. Attainment of the starter cutout speed is communicated to the electronic control unit 22 as a frequency signal originating from a proximeter-type sensor placed in the starter 20. When the electronic control unit 22 receives the appropriate frequency signal, it de-energizes the forementioned coil, which closes the starter inlet valve 24 so that the starter 20 stops running.

Turning to FIG. 2, there is schematically illustrated a conventional air turbine starter 20. When the starter 20 is running, pressurized air (indicated by arrows 30) is being supplied through an air inlet (not shown) to the turbine wheel 32 and is expanding through and imparting energy to the latter, thus exerting a torquing force on the turbine shaft 34 before departing through an air outlet 36 as exhaust. The torque is transmitted through a set of gears 38,40,42 to a geared hub 44. From the hub 44, the torque is transmitted through a sprag-type clutch 46 to an inner shaft 48 which is mechanically coupled to the output shaft 26. The starter 20 stops running when torque is no longer transmitted from the turbine shaft 34 to the output shaft 26. However, in a typical application such as that illustrated in FIG. 1, the output shaft 26 and the inner shaft 48 continue to rotate at high speed, being driven by the engine 10 after the starter 20 discontinues running. The overrunning clutch 46, however, operates to prevent torque transmission from the inner shaft to the hub 44. The post-cutout lubrication needs of the clutch 46 exceed the total pre-cutout lubrication needs of the starter 20. Accordingly, the starter 20 contains a volume of lubricant 50 which meets the post-cutout needs of the clutch 46, but which exceeds the pre-cutout needs of the starter. During the pre-cutout mode when the starter 20 is running, the lubricant 50 is churned by internal, rotating components of the starter and is a source of parasitic loss of torque. The degree of parasitic loss increases with the volume of lubricant 50 contained in the starter 20. If this loss can be eliminated or reduced, a number of advantages may be provided. To the end of explaining these advantages, attention is now redirected to FIGS. 1 and 3.

FIG. 3 is a generalized graph of output torque versus speed for an air turbine starter 20 employed as indicated in FIG. 1. A range of cutout speeds is indicated by opposing arrows 52. Assuming the compressor 16, the conduit 18, and the starter 20 are properly designed, built and installed so that the starter meets the starting torque requirements for the engine 10, the solid-line curve 54 represents the performance of the starter. However, over time, internal components of the compressor 16 are abraded. This may result in a significant decrease in pressure for the air supplied to the starter 20, and is of particular concern in applications such as military helicopters wherein the compressor 16 may be routinely exposed to abrasive airborne particulates. The decrease in available inlet pressure adversely affects the performance of the starter, as represented in part by the dashed line 56. If the decrease in pressure is sufficient to prevent the starter from reaching cutout speed, then the electronic control unit 22 will not receive a sufficiently high frequency signal from the sensor 28 to respond by closing the inlet valve 24. Consequently, the starter 20 continues to run until functionally destroyed by overheating. Even if degradation in the performance of the compressor 16 is insufficient to prevent the starter 20 from attaining cutout speed, the performance of the starter may be sufficiently impaired to significantly increase the time required for the engine 10 to attain its normal operating speed.

Thus, to the degree that the performance of an air turbine starter is improved by reducing the forementioned parasitic losses, the following advantages or potential advantages are realized: first, a decrease in the number of starter failures for particular applications thereof; second, an increase in the time over which the compressor can be operated before replacement of abradable components is necessary in said applications; and third, an improvement in the overall performance of such air turbine starters, generally.

SUMMARY OF THE INVENTION

The present invention provides the above-described advantages and comprises, in combination with an air turbine starter which contains a liquid lubricant, a passive hydraulic capacitor connected to the starter and in fluid communication therewith. The starter is operable when running to hydraulically charge the capacitor with a portion of the lubricant it normally contains, thereby reducing parasitic loss in output torque that is attributable to impedance of rotational movement by the lubricant contained in the starter. The capacitor is operable when the starter stops running to discharge lubricant back into the starter in order to satisfy post-cutout lubrication requirements for an overrunning clutch disposed in the latter.

DESCRIPTION OF THE PREFERRED EMBODIMENT

As used herein, the word "passive" as applied to the term "hydraulic capacitor" means a hydraulic capacitor that does not employ moving parts such as diaphragms, bellows, or piston-spring combinations, for example.

Figure 4:
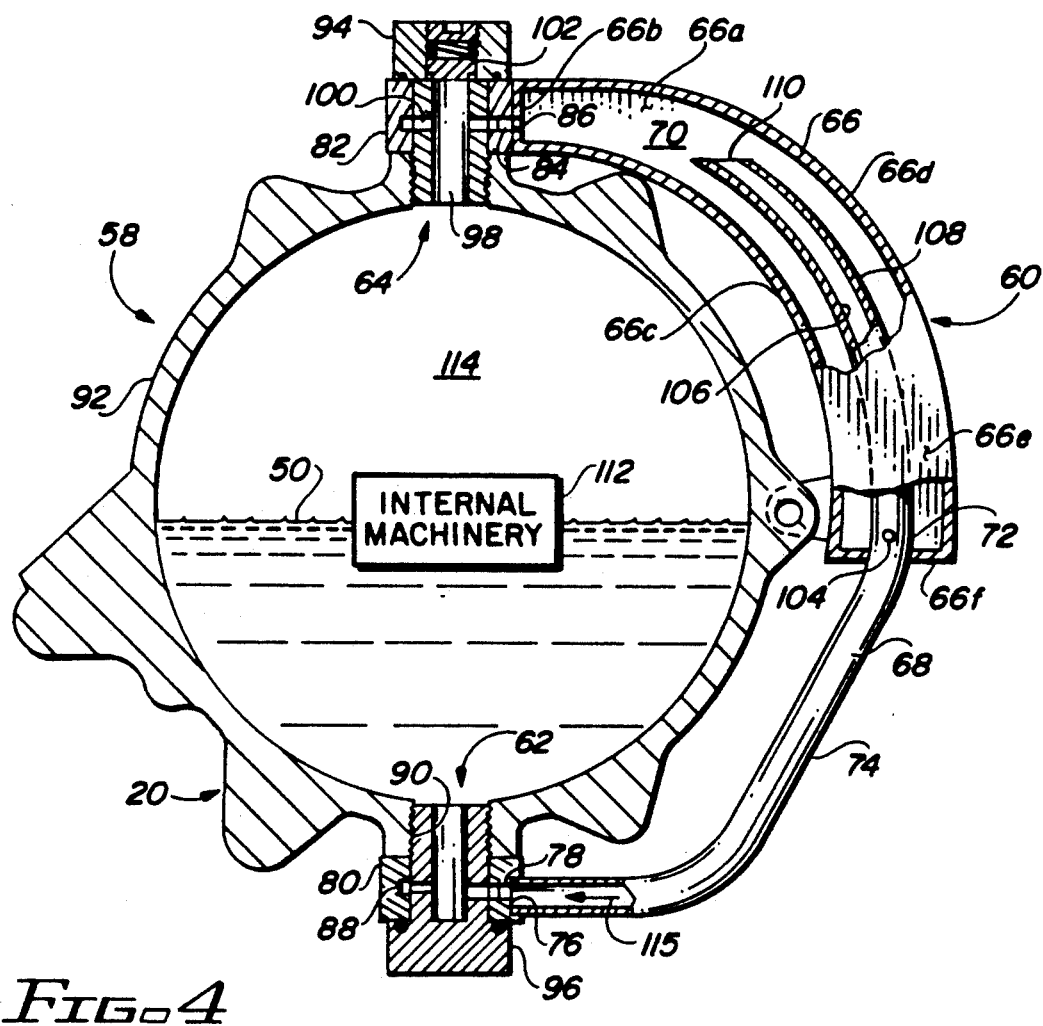
FIG. 4 is a cross-sectional view of the preferred embodiment of the invention. The internal mechanical components of the starter are represented schematically for simplicity of illustration.

Referring to FIG. 4 which illustrates apparatus 58 combining a passive hydraulic capacitor 60 and an air turbine starter motor 20 (hereinafter "starter"), it can be seen that the capacitor is connected to the starter both at a lubricant inlet 62 and a lubricant outlet 64 of the latter.

The capacitor 60 is composed entirely of stainless steel and comprises an accumulator 66 and a conduit 68. The accumulator 66 is formed by welding together six walls 66a-66f to form a capacitance chamber 70. Preferably, the shape of the accumulator 60 is generally conformal with the exterior shape of the motor 20 to minimize space requirements. The bottom wall 66f of the accumulator 66 has a hole formed therethrough to accommodate receipt of the elongate, tubular conduit 68. The conduit 68 has a first portion 72 extending through the bottom wall 66f and into the chamber 70, and a second portion 74 extending outwardly from the accumulator 66and toward the inlet 62. The conduit 68 is welded to the bottom wall 66f, forming an annular seal that circumferentially surrounds the conduit. The distal end 76 of the second portion 74 of the conduit 68 is received in a stepped cross-bore 78 formed in a lug 80, and the conduit is similarly welded to the lug to form an annular seal. A second lug 82 having a cross-bore 84 formed therein is sealingly welded to the top wall 66b of the accumulator 66. A hole 86 is formed through the top wall 66b to provide fluid communication from the cross-bore 84 to the capacitance chamber 70. Each of the lugs 80,82 has a bore formed therethrough to accommodate receipt of a threaded bolt, and an annular recess (as at 88) extending in a radially outward direction from the bore to the cross-bore (as at 78).

The lubricant inlet 62 and lubricant outlet 64 of the starter 20 are provided by tapped bores (as at 90) formed in the starter housing 92. These may be existing drain and fill holes, respectively, or holes which are separately provided for the purpose of communicating with the capacitor 60. The capacitor 60 is secured to the starter 20 by threaded bolts 94,96 which extend through the lugs 82,80 and engage the tapped bores 90. Each bolt has an axially-extending bore (as at 98), and a crossbore (as at 100) that is suitably located to provide fluid communication from the axially-extending bore to the annular recess 88. The top bolt 94 incorporates a conventional pressure-relief valve 102.

The first portion 72 of the conduit 68 has an orifice 104 formed between its inner and outer walls 106,108. The cross-sectional flow area of the orifice 104 is sufficiently small to ensure that lubricant 50 contained in the accumulator 66 will discharge through the orifice at a rate of flow which is less than the rate at which the chamber 70 is filled (i.e., the rate at which the capacitor 60 is charged) during operation of the starter 20. The first portion 72 extends to an open end 110 thereof which defines a maximum hydraulic charge. That is, the cross-sectional flow area defined by the inner wall 106 of the conduit 68 is sized such that the spill rate into the open end 110 equals or exceeds the forementioned rate at which the capacitor 60 is charged.

Operation proceeds as follows. When the auxiliary power unit 12 is operated to start the main engine 10, it drives the shaft-driven compressor 16 via the gearbox 14. Air bled from the compressor 16 powers the starter 20. As the internal machinery 112 of the starter 20 rotates, it churns the lubricant 50 and the resulting action creates a pressurized lubricant/air foam in the area 114 above the lubricant reservoir. This foam is forced under pressure through the outlet 64 and into the capacitor 60 at a rate which is a function of the rpm speed of the starter 20. Under normal operating conditions, this rate always exceeds the rate at which the lubricant 50 can flow through the orifice 104. Consequently, the chamber 70 is increasingly filled until the level of lubricant 50 therein reaches the open end 110 of the first conduit portion 72, after which lubricant in excess of the maximum charge (which is fixed by the volume of the chamber 70 and the position of the open end 110) spills into the open end. The lubricant then flows along the flow path 115 defined by the conduit 68 and returns to the starter 20 via the inlet 62. As the capacitor 60 is being charged by the starter 20, lubricant is discharging from the capacitor via the orifice 104. When the starter 20 stops running, this discharge through the orifice 104 continues until the fill level drops below the orifice.

Figure 1:
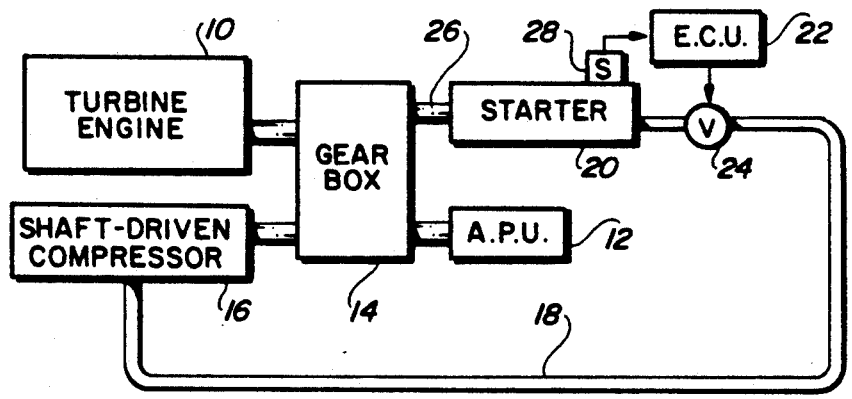
FIG. 1 is a schematic diagram illustrating the startup of a turbine engine.
Figure 2:
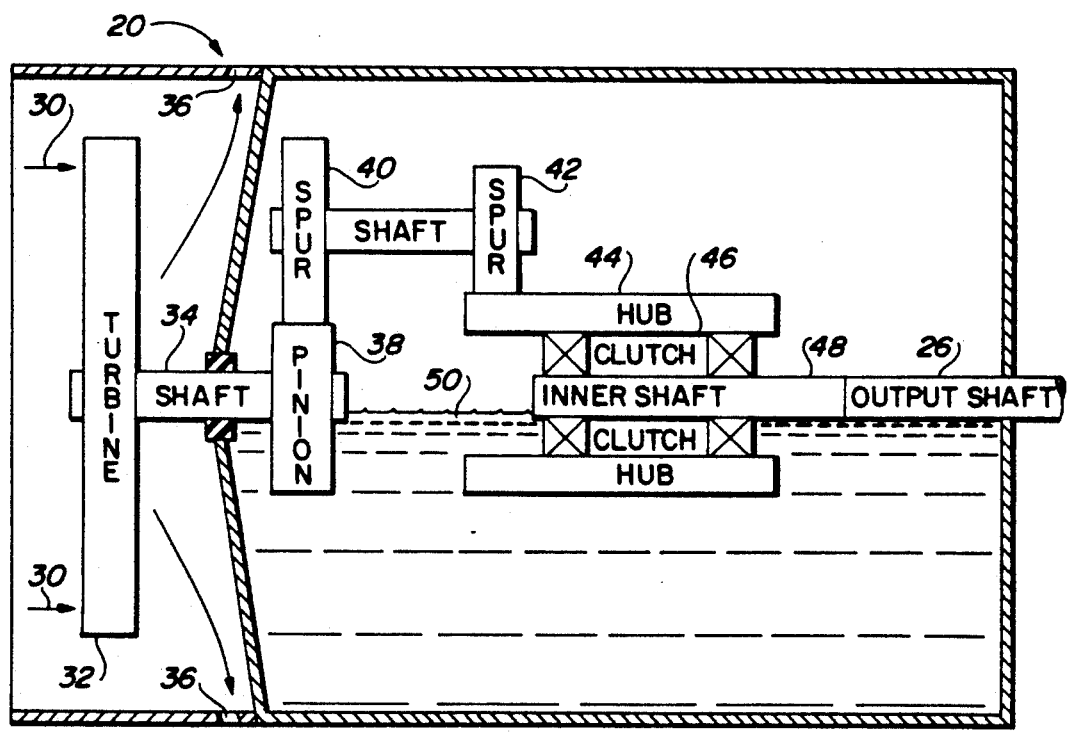
FIG. 2 is a schematic drawing of a conventional air turbine starter.
Figure 3:
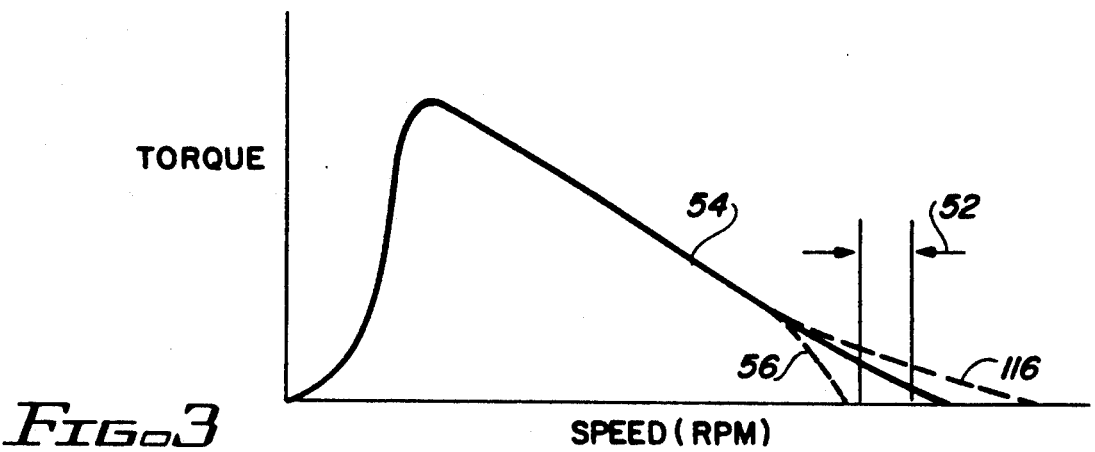
FIG. 3 is a graph of output torque versus rotational speed for an air turbine starter employed as illustrated in FIG. 1.

Effectively, charging the capacitor 60 decreases the volume of lubricant 50 contained in the starter 20. This decreases the drag on the rotating starter components, thus eliminating the parasitic loss in output torque otherwise attributable to that portion of the lubricant 50 held in the capacitor 60. Consequently, the torque versus speed characteristics of the starter 20 are significantly improved, as is partially represented by the dashed line 116 in FIG. 3.

The reader should understand that the accompanying drawings and the foregoing portion of the description are not intended to restrict the scope of the invention to the preferred embodiment thereof or to specific details which are ancillary to the teaching contained herein. Accordingly, the invention should be construed in the broadest manner which is consistent with the following claims and their equivalents.

What is claimed is:

1. In combination with an air turbine starter motor which includes a motor housing, said motor being adapted to contain liquid lubricant to be used for internal lubrication, said motor being adapted to provide an inlet and an outlet for said, lubricant, apparatus comprising a passive hydraulic capacitor connected to said motor such that said capacitor is in fluid communication with said inlet and said outlet, said motor being operable when containing said lubricant and running to hydraulically charge said capacitor by forcing, said lubricant outwardly through said outlet, said capacitor being operable when said motor is running to receive said lubricant and to discharge said lubricant through said inlet and into said motor at a discharge rate which is less than a charge rate at which said capacitor is charged by said motor, said capacitor being operable to continue discharging accumulated lubricant after said motor discontinues running.

2. The invention of claim 1 wherein said capacitor comprises:
an accumulator defining a capacitance chamber of fixed volume; and
an elongate conduit having inner and outer walls, said inner wall defining a flow path having a cross-sectional flow area, a first longitudinally-extending portion of said conduit extending into said chamber, a second longitudinally-extending portion of said conduit extending outwardly from said accumulator, and toward said inlet, said first portion having an orifice formed between said inner and outer walls and in fluid communication with both said chamber and said flow path, whereby in discharging from said capacitor, said lubricant flows from said chamber through said orifice and into said flow path, said orifice having a cross-sectional flow area which is less than said cross-sectional flow area of said flow path and sufficiently small to provide said discharge rate.

3. The invention of claim 2 wherein said first portion extends into said chamber from a bottom wall of said accumulator.

4. The invention of claim 2 wherein said first portion extends into said chamber in a direction of increasing hydraulic charge to an open end of said first portion, and whereby in operation of said motor, said chamber is increasingly filled by said lubricant until said lubricant reaches a fill level substantially coincident with said open end, after which excess lubricant flowing from said motor to said chamber spills into said open end, said cross-sectional flow area of said flow path being sufficiently large to provide a spill rate into said open end which is at least as great as said rate at which said capacitor is charged.

5. Apparatus comprising:
an air turbine motor including a motor housing said motor containing a liquid lubricant and being adapted to provide an inlet and an outlet for said lubricant; and
a passive hydraulic capacitor attached to said motor and in fluid communication with said inlet and outlet,
said motor being operable when running to charge said capacitor with a portion of said lubricant,: capacitor being operable when charged and when said motor ceases running to return said portion to said motor.

6. The invention of claim 5 wherein said capacitor is operable when said motor is running to return lubricant to said motor at a rate which is less than a rate at which said capacitor is being charged.

7. The invention of claim 5 wherein said capacitor comprises:
an accumulator in fluid communication with said inlet and said outlet and forming a capacitance chamber; and
means disposed in said chamber and cooperating with said accumulator for limiting the extent to which said motor can charge said capacitor while simultaneously permitting flow of lubricant from said motor to said chamber.

* * * * *